(12) United States Patent
Gerdes et al.

(10) Patent No.: US 7,718,022 B2
(45) Date of Patent: May 18, 2010

(54) RESONANT NODAL MOUNT FOR LINEAR ULTRASONIC HORNS

(75) Inventors: Ronald W. Gerdes, Saint Paul, MN (US); John R. Mlinar, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/121,304

(22) Filed: May 15, 2008

(65) Prior Publication Data

US 2009/0283570 A1 Nov. 19, 2009

(51) Int. Cl.
*B32B 37/00* (2006.01)

(52) U.S. Cl. .................................. 156/73.1; 156/580.2
(58) Field of Classification Search ................ 156/73.1, 156/580.1, 580.2; 228/1.1, 110.1; 425/174.2; 264/442, 443, 444, 445; 310/321, 323.01, 310/323.18
See application file for complete search history.

(56) References Cited

U.S. PATENT DOCUMENTS

| 3,529,660 | A | 9/1970 | Obeda |
| 4,647,336 | A | 3/1987 | Coenen et al. |
| 5,385,288 | A * | 1/1995 | Kyomasu et al. ............. 228/1.1 |
| 6,786,384 | B1 | 9/2004 | Haregoppa |

* cited by examiner

*Primary Examiner*—James Sells
(74) *Attorney, Agent, or Firm*—Gregory D. Allen

(57) ABSTRACT

A resonant, nodal mount suitable for linear horns.

10 Claims, 3 Drawing Sheets

RESONANT NODAL MOUNT FOR LINEAR ULTRASONIC HORNS

TECHNICAL FIELD

The present invention relates to ultrasonic welding mounts, and particularly to a mount for a linear ultrasonic horn having a predetermined resonant frequency with a mount having about the same resonant frequency.

BACKGROUND

Ultrasonic welding is typically used to join multiple parts together using vibrations converted into heat energy. Common types of ultrasonic welding are plunge and continuous welding. In plunge welding, an ultrasonic horn plunges (travels towards the parts) and transmits vibrations into a top part. In continuous welding, for example scan or rotary welding, the ultrasonic horn is typically stationary or rotating and the part is moved beneath it. Continuous ultrasonic welding is typically used for sealing fabrics, films, and other parts. Each of the ultrasonic welding types involves a horn.

Ultrasonic horns impart energy to the parts to be welded at a selected wavelength, frequency, and amplitude. The horn resonates at the frequency of the ultrasonic transducer energizing it; transducers having a frequency of about 20,000 Hertz being perhaps the most commonly available commercially. For example, a rotary horn typically includes a shaft with input and output ends, and a welding portion mounted on and coaxial with the output end. The diameter of the welding portion is typically greater than the diameter of the shaft. The welding portion has a cylindrical weld face having a diameter that expands and contracts with the application of vibration energy. Typically, a rotary horn is cylindrical and rotates about a longitudinal axis. The input vibration is in the axial direction and the output vibration is in the radial direction. The horn and anvil are conveniently mounted close to each other, and the anvil can rotate in the opposite direction of the horn. The part (or parts) to be welded passes between the cylindrical surfaces at a linear velocity, equal to the tangential velocity of the cylindrical surfaces.

As might be expected, the fact that the horn is undergoing intense vibration gives rise to the problem of maintaining a grip on it during operation. Typically, two methods are used to mount an ultrasonic horn: nodal mounting and non-nodal mounting. A node is a position of the horn that has zero displacement in one or more directions. As used with respect to horns in this application, a node is a point or region on an ultrasonic horn where the longitudinal displacement is negligible or zero and the radial displacement is at or near its maximum when the horn is in resonance. An anti-node is a point or region where the longitudinal displacement is at or near its maximum and the radial displacement is at or near its minimum.

Co-assigned U.S. Pat. No. 6,786,384, "Ultrasonic Horn Mount," which is hereby incorporated by reference, discloses an effective mount for a rotary ultrasonic horn having a predetermined resonant frequency. The disclosed mount has itself about the same resonant frequency such that the mount is driven by the horn it is holding in such a way that the radial displacement imparted by the horn to the mount is dissipated such that an outer bearing surface is left largely unmoving (in a radial sense, during operation it is rotating circumferentially).

Unfortunately, this disclosure is unhelpful with regard to mounting a linear horn for scan welding. The art would be advanced by providing the advantages of a resonant, nodal mount to a linear welding horn.

SUMMARY

Described herein is a resonant, nodal mount particularly suitable for linear horns. In one embodiment, the disclosure describes a system for ultrasonic manufacturing having a horn having a resonance at a predetermined frequency, and a mount for that horn. The mount includes a contacting portion having an inner bearing surface that is used for actually contacting the horn. A flange extends outwardly from the connecting shaft, ending in an outer perimeter. An annular mounting portion is attached to the flange between the contacting portion and the outer perimeter. The mount is constructed such that the mount has a resonance at about the predetermined frequency, and in operation the contacting portion of the mount is coupled to the horn at a point where the horn has a node at said predetermined frequency.

DETAILED DESCRIPTION

Figure 1:
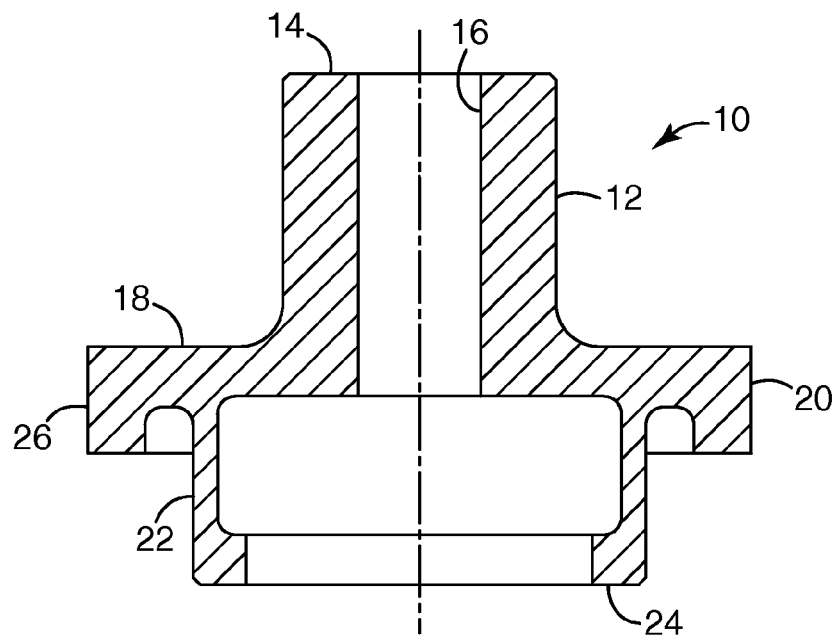
FIG. 1 shows a cross section side view of a mount.

Referring now to FIG. 1, a cross section view of a mount is illustrated. Mount 10 is a solid of revolution having the depicted cross-section. Mount 10 includes contacting portion 12 having an inner bearing surface 14. Contacting portion 12 my optionally have a bore 16. Flange 18 extends outwardly from contacting portion 12, ending in an outer perimeter 20. An annular mounting portion 22 is attached to the flange 18 between the contacting portion 12 and the outer perimeter 20. The end of the annular mounting portion 22 opposite flange 18 is outer bearing surface 24. In one embodiment, an annular counterweight 26 is mounted on the flange 18 adjacent the perimeter 20.

Figure 2:
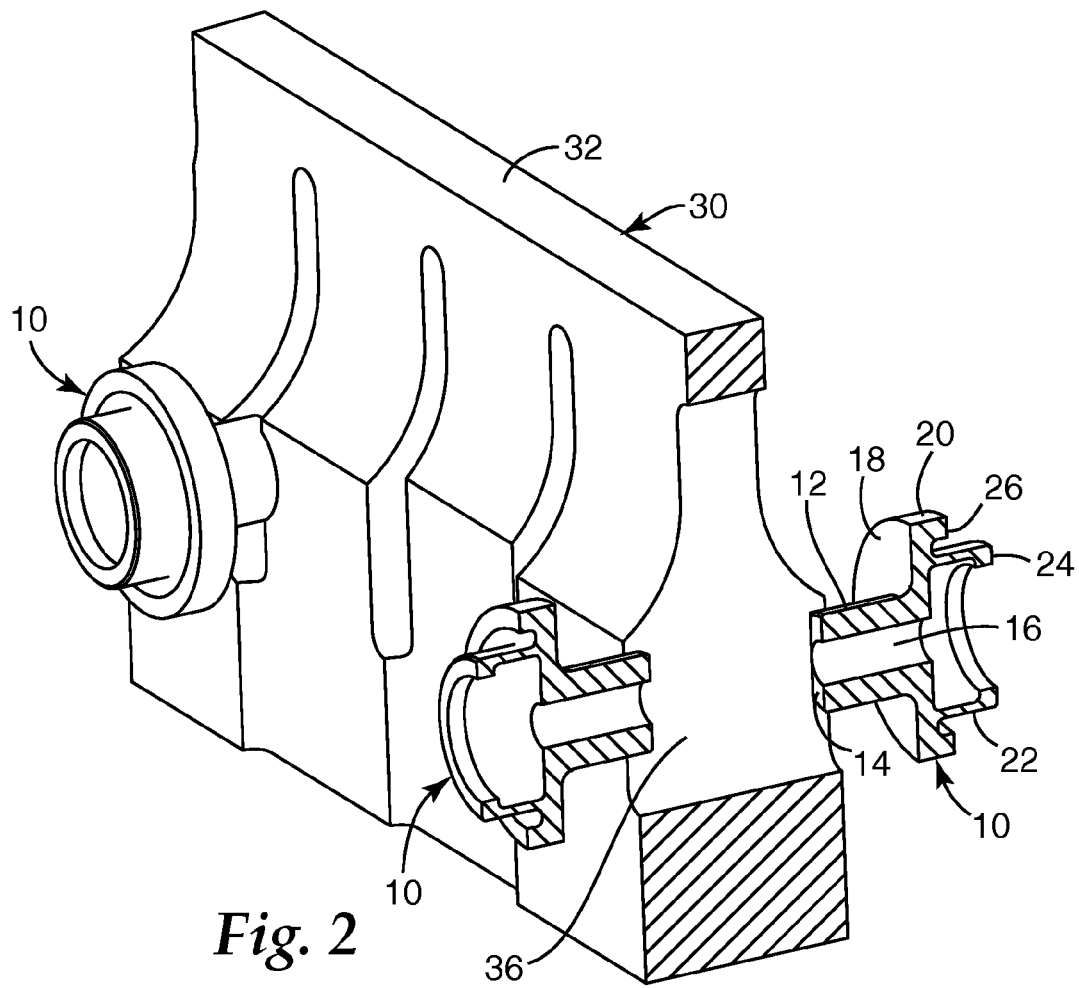
FIG. 2 shows a cross-section perspective view of a welding system incorporating several of the mounts according to FIG. 1.

Referring to FIG. 2, a cross-section perspective view of a welding system incorporating several of the mounts according to FIG. 1 is illustrated. The mounts 10 support linear horn 30. Linear horn 30 has a welding surface 32 against which, for example, sheet material is passed for scan welding. Linear horn 30 in one embodiment is energized by an ultrasonic transducer acting at an end 34. The mounts 10 contact linear horn 30 at points that are nodes 36 when the horn is energized at a predetermined frequency. Mount 10 is constructed such that the mount has a resonance at about that predetermined frequency.

Figure 3:
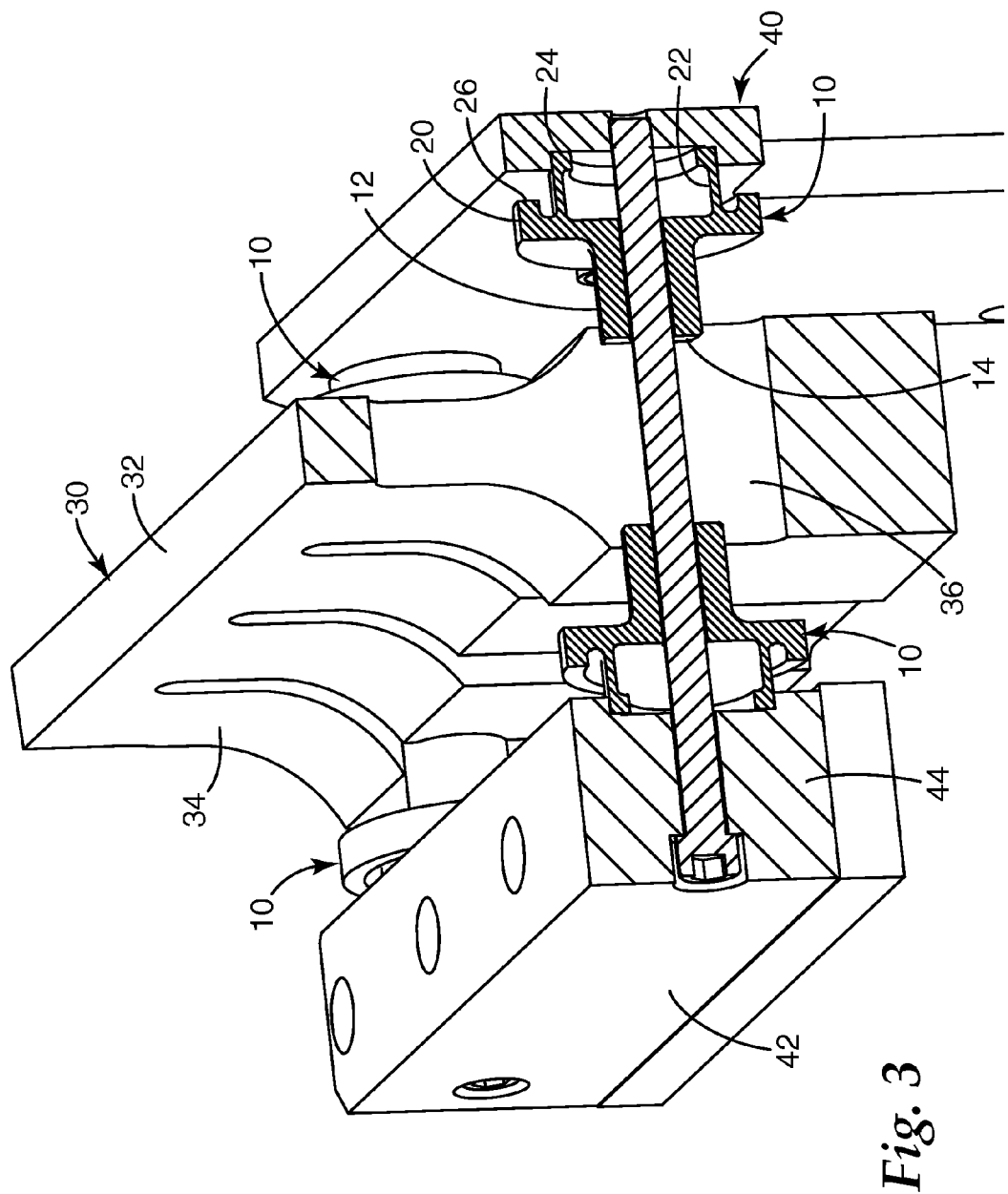
FIG. 3 shows a cross-section perspective view of the welding system of FIG. 2 being supported by clamping bars.

Referring now to FIG. 3, a cross-section perspective view of the welding system of FIG. 2 being supported by clamping bars is illustrated. Clamping bars 40 and 42 compress the mount-and-horn assembly so that is can be supported effectively within, for example a webhandling line conveying the material needing to be welded. Shallow counterbores 44 may be present for receiving the mounting portion 22 of the mounts 10.

Figure 4:
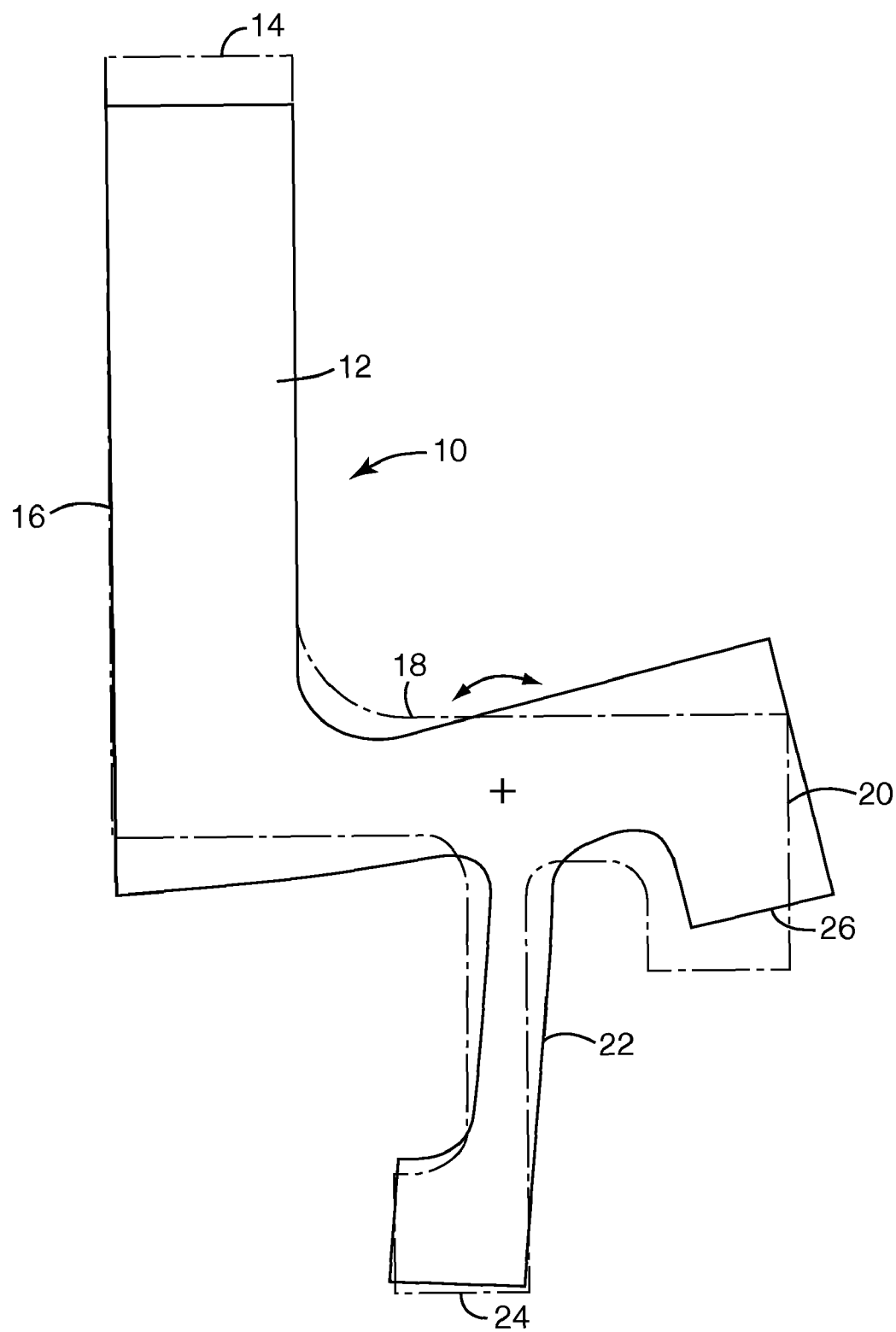
FIG. 4 is a comparative visualization of a typical cross section of the mount at the limits of motion imparted when the mount is resonating at the predetermined frequency.

Referring now to FIG. 4, an overlapping comparative visualization of a typical cross section of the mount 10 at the limits of motion imparted when the mount is resonating at the predetermined frequency is illustrated. The mount 10 in its unstressed configuration is shown in phantom lines; its maximally stressed configuration (when the lateral expansion of the vibrating linear horn 30 is greatest) is shown in solid lines. It is to be noted how much smaller the displacement from the unstressed condition exhibited by the outer bearing surface 24 compared to the interior bearing surface. With such small displacements at the outer bearing surface 24, the mount can be successfully held by the clamping bar 40 (seen in FIG. 3).

EXAMPLE

Several mounts generally as depicted in FIG. 1 were machined from titanium 6A1 4V alloy. A typical linear horn 22.9 cm wide and designed to resonate near 20,000 Hertz was also fabricated from titanium 6A1 4V was used for this test. An ultrasonic transducer, commercially available from Branson Ultrasonics Corporation of Danbury, Conn. was attached at one end of a conventional booster that in turn was mounted to the linear horn. This arrangement was used to energize the horn during three experiments.

In the first experiment, the horn was unclamped in order to provide a control value for the amount of power drawn by the set up. The power output on the ultrasonic power supply was set to 100%.

In the second experiment, the horn was mounted using four of the mounts, each pressed against a vibration node, between a pair of clamping bars generally as depicted in FIG. 3. The power output on the ultrasonic power supply was set to 50%.

The third experiment was similar to the second, except that the power setting was again set to 100%, just as for the first experiment. The conditions and results are summarized in Table 1.

Most tellingly, with the same power setting between Tests 1 and 3, the power draw showed only modest increase, and the tuning frequency changed very little. This illustrates that the nodal mounts did not significantly dissipate the transducer's energy, allowing efficient operation of the horn during, for example, scan welding. Furthermore the operation was quiet during Tests 2 and 3. Noisy operation would have been an indicator of relative motion between the mount and the clamping bars, implying both a loss of efficiency and unwanted wear between the moving and stationary parts.

TABLE 1

|  | Test 1 | Test 2 | Test 3 |
|---|---|---|---|
| Mounting condition | No mounts | Four mounts of invention | Four mounts of invention |
| Power draw, Watts | 100 | 110 | 220 |
| Tuning frequency, Hz | 19997 | 19991 | 19991 |
| Booster gain | 1.5:1 | 1.5:1 | 1.5:1 |
| Power setting | 100% | 50% | 100% |

While the invention has been particularly shown and described with reference to various embodiments thereof, it will be understood by those skilled in the art that various other changes in the form and details may be made therein without departing from the spirit and scope of the invention.

What is claimed is:

1. A system for ultrasonic manufacturing, comprising:
   a horn having a resonance at a predetermined frequency; and
   a mount comprising
      a contacting portion having an inner bearing surface,
      a flange extending outwardly from the contacting portion, the flange having an outer perimeter,
      an unconstrained annular counterweight mounted on the flange adjacent the outer perimeter, and
      an annular mounting portion attached to the flange between the contacting portion and the outer perimeter; wherein
   the mount has a resonance at about the predetermined frequency, wherein the contacting portion is coupled to the horn at a point where the horn has a node at said predetermined frequency.

2. The system according to claim 1 wherein the horn is a linear horn.

3. The system according to claim 1 wherein the mount is a solid of revolution and wherein the end of the annular mounting portion opposite the flange is an outer bearing surface.

4. The system according to claim 1 wherein the annular mounting portion comprises an outer bearing surface, and the motion of the outer bearing surface is less than ten percent of the motion of the inner bearing surface when the mount element is driven at the predetermined frequency.

5. A mount for ultrasonic horn, comprising:
   a contacting portion having an inner bearing surface,
   a flange extending outwardly from the contacting portion, the flange having an outer perimeter,
   an unconstrained counterweight mounted on the flange adjacent the outer perimeter, and
   an annular mounting portion attached to the flange between the contacting portion and the outer perimeter, such that the end of the annular mounting portion opposite the flange is an outer bearing surface; wherein
   the outer bearing surface is a node when the interior bearing surface is driven at a predetermined frequency.

6. The mount according to claim 5 wherein the motion of the outer bearing surface is less than ten percent of the motion of the interior bearing surface when the mount element is driven at the predetermined frequency.

7. The mount according to claim 5 wherein the flanges extend at an angle other than perpendicular from the base element.

8. The mount according to claim 5 wherein the outer bearing surface is generally parallel to the interior bearing surface.

9. A method of mounting an ultrasonic horn, comprising:
   providing a horn having a resonance at a predetermined frequency;
   providing a mount comprising
      a contacting portion having an inner bearing surface,
      a flange extending outwardly from the contacting portion, the flange having an outer perimeter,
      an unconstrained counterweight mounted on the flange adjacent the outer perimeter, and
      an annular mounting portion attached to the flange between the contacting portion and the outer perimeter; wherein
   the mount has a resonance at about the predetermined frequency; and
   attaching the contact portion of the mount to the horn at a point where the horn has a node at said predetermined frequency.

10. The method according to claim 9 wherein the annular mounting portion comprises an outer bearing surface, and the motion of the outer bearing surface is less than ten percent of the motion of the interior bearing surface when the mount element is driven at the predetermined frequency.

* * * * *

UNITED STATES PATENT AND TRADEMARK OFFICE
CERTIFICATE OF CORRECTION

| | | |
|---|---|---|
| PATENT NO. | : 7,718,022 B2 | Page 1 of 1 |
| APPLICATION NO. | : 12/121304 | |
| DATED | : May 18, 2010 | |
| INVENTOR(S) | : Gerdes et al. | |

It is certified that error appears in the above-identified patent and that said Letters Patent is hereby corrected as shown below:

Column 3, Line 15 - Delete "6A1 4V" and insert -- 6AI 4V --, therefor.

Column 3, Line 17 - Delete "6A1 4V" and insert -- 6AI 4V --, therefor.

Column 3, Line 64 (Approx.) - In Claim 1, after "comprising" insert -- : --.

Column 4, Line 46 - In Claim 9, after "comprising" insert -- : --, therefor.

Signed and Sealed this
Eleventh Day of January, 2011

David J. Kappos
*Director of the United States Patent and Trademark Office*